United States Patent [19]

Yamamura et al.

[11] Patent Number: 4,537,530

[45] Date of Patent: Aug. 27, 1985

[54] MARINE CABLE BURYING METHOD AND DEVICE THEREFOR

[75] Inventors: Kazuomi Yamamura, Yokohama; Hideo Ishihara, Kamakura; Yoshinao Iwamoto, Fujimi; Hifumi Sakaguchi, Abiko; Masao Morita; Toshio Izawa, both of Tokyo, all of Japan

[73] Assignee: Kokusai Denshin Denwa Co., Ltd., Tokyo, Japan

[21] Appl. No.: 585,631

[22] Filed: Mar. 7, 1984

Related U.S. Application Data

[63] Continuation of Ser. No. 250,882, Apr. 3, 1981, abandoned.

[30] Foreign Application Priority Data

Apr. 3, 1980 [JP] Japan .................. 55-42758

[51] Int. Cl.³ .............................................. F16L 1/04
[52] U.S. Cl. ..................................... 405/160; 405/161; 367/19
[58] Field of Search ............... 405/157, 158, 159, 160, 405/161, 162, 163, 175; 104/244.1; 180/131; 367/19, 106

[56] References Cited

U.S. PATENT DOCUMENTS

| | | | |
|---|---|---|---|
| 3,434,297 | 3/1969 | Gretter et al. | 405/160 |
| 3,803,541 | 4/1974 | Shiroyama et al. | 367/106 |
| 3,857,250 | 12/1974 | Di Tella et al. | 405/160 |
| 3,877,237 | 4/1975 | Norman | 405/160 |
| 4,025,895 | 5/1977 | Shatto | 367/106 |
| 4,037,189 | 7/1977 | Bell et al. | 405/157 X |
| 4,041,876 | 8/1977 | Michel | 104/244.1 |
| 4,149,326 | 4/1979 | Rosa et al. | 405/160 |
| 4,193,713 | 3/1980 | van Nes | 405/159 |
| 4,384,808 | 5/1983 | Yamamura et al. | 405/160 |

Primary Examiner—Stephen J. Novosad
Assistant Examiner—Beverly E. Hjorth

[57] ABSTRACT

The present invention aims at providing a method and a device therefor which can effectively as well as accurately bury a cable under marine beds not only when a cable is newly laid and buried but also when a cable has to be reburied. The method and the device according to the present invention are characterized in that a burying device is guided to approach the cable by using a travelling member provided on said burying device, a travelling control mechanism thereof being controlled by a receiving output from a transmitter which is mounted on the cable in advance by a receiver provided on the burying device, that the cable is caught and held by a cable engaging member of said burying device while the burying device is detecting the buried cable track and travelling therealong, and that at the same time an excavation member of said burying device digs and forms a groove while the burying device guides and buries the cable within the excavated groove. The method according to the present invention is further characterized in that the burying device is provided with a travelling device which is controlled by the output from a receiver which receives the output from a transmitter on the cable, that said device body is provided at the middle portion thereof with a cable engaging member having a cable engaging mechanism as well as a buried cable route detection mechanism and an excavation member.

1 Claim, 14 Drawing Figures

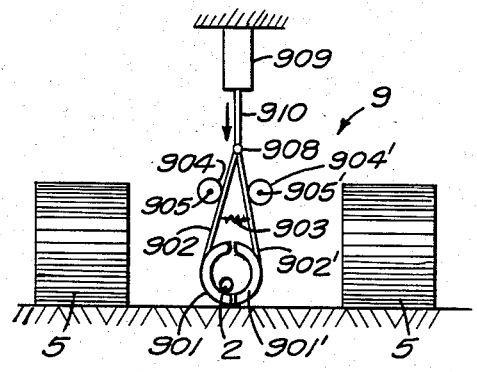
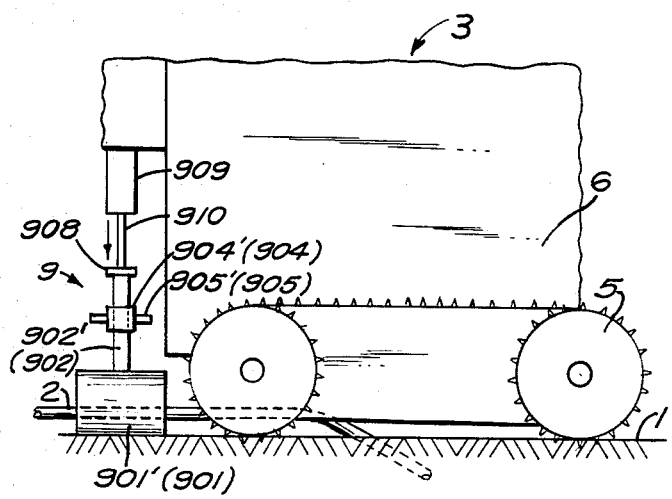
FIG. 5(a)   FIG. 5(b)
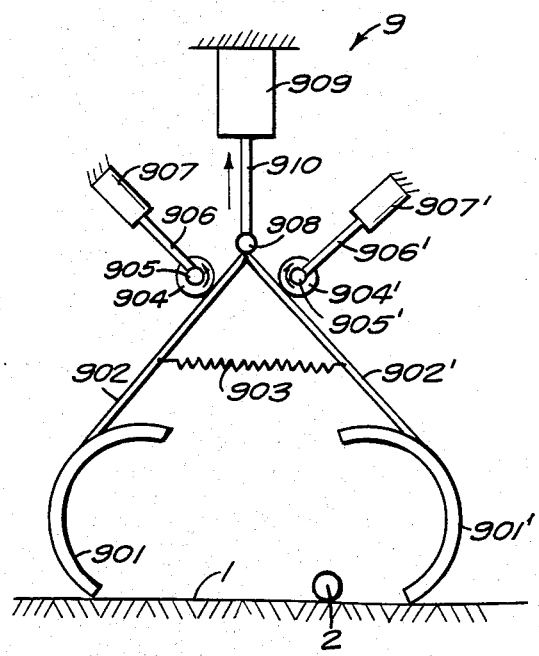
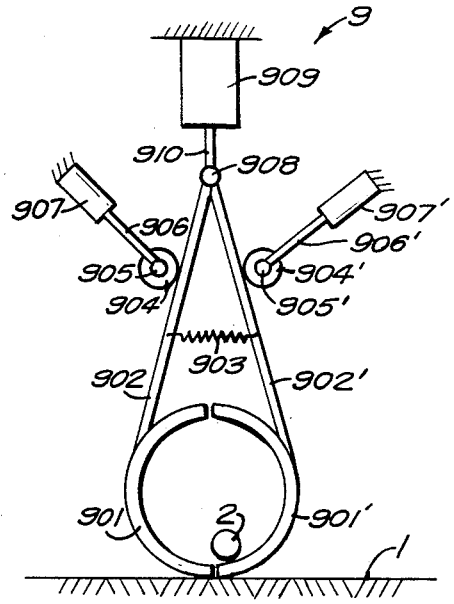
FIG. 6(a)   FIG. 6(b)

MARINE CABLE BURYING METHOD AND DEVICE THEREFOR

This application is a continuation of application Ser. No. 250,882, filed Apr. 3, 1981, now abandoned.

BACKGROUND OF THE INVENTION

This invention relates to a marine cable burying method and a device therefor for burying communication or electric cables under marine beds in order to protect such cables from anchors of vessels or fishing tools.

In the prior art when a cable has to be buried under a marine bed, a burying device is generally tugged by a mother ship to lay and simultaneously bury the cable under the marine bed. More particularly, in this method, a cable is held within the burying device in advance of the mother ship, the burying device is lowered down onto the marine bed, and the burying device is tugged by the mother ship so that an excavation member provided on the burying device can dig a groove on the marine bed, whereby the cable is laid as well as buried in the groove at the same time. This method is superior in operability and efficiency when a cable is to be newly laid and buried under the marine bed; however, if a part of a cable which has been buried under the marine bed is broken, and, after being pulled up and repaired on the mother ship, is to be buried again, the method has such difficulties as requires a special mother ship with excellent operability to guide a burying device along the already buried portion of the cable. Further, since buried cables tend to take a tortuous rather than a straight course due to tidal current, it is extremely difficult to accurately detect the place where the repaired cable should be buried, unavoidably leaving a considerable portion thereof unburied.

Moreover, since this method necessitates the cable to be engaged within the burying device in advance on the mother ship and then lowered onto the marine bed by using a rope, the cable might be entangled with the rope due to the influence of tidal current, necessarily bringing the operation to a stop or causing the cable itself to be damaged by twisting or breaking.

SUMMARY OF THE INVENTION

The present invention focuses upon such drawbacks of the conventional methods and aims at providing a method and a device therefor which can effectively as well as accurately bury a cable under marine beds not only when a cable is newly laid and buried but also when a cable has to be reburied. The method and the device according to the present invention comprise a burying device is guided to approach the cable by using a travelling member provided on said burying device, a travelling control mechanism thereof being controlled by a receiving output from a transmitter which is mounted on the cable in advance by a receiver provided on the burying device, that the cable is caught and held by a cable engaging member of said burying device while the burying device is detecting the buried cable track and travelling therealong, and that at the same time an excavation member of said burying device digs and forms a groove while the burying device guides and buries the cable within the excavated groove.

The method according to the present invention is further characterized in that the burying device is provided with a travelling device which is controlled by the output from a receiver which receives the output from a transmitter on the cable, that said device body is provided at the middle portion thereof with a cable engaging member having a cable engaging mechanism as well as a buried cable route detection mechanism and an excavation member.

The present invention will now be explained in detail referring to an embodiment indicated in attached drawings.

BRIEF DESCRIPTION OF THE DRAWINGS

FIGS. 5(a) and 5(b) a frontal and side views of an embodiment of the cable engaging member according to the present invention while FIGS. 6(a) and 6(b) are views to explain the operation of the cable engaging mechanism thereof.

DETAILED DESCRIPTION OF PREFERRED EMBODIMENT

Figure 1A:
FIGS. 1(a) and 1(b) schematically show states where a cable is laid on the marine bed and is buried thereunder.
Figure 1B:

FIG. 1(a) indicates the state where a cable 2 is laid on a marine bed 1 while FIG. 1(b) the state where the already laid cable 2 is buried under the marine bed 1. The marine bed cable burying method and the device therefor according to the present invention aim at providing a burying method and a device therefor which, under any conditions, can make effectively and accurately the state shown in FIG. 1(a) to become the state in FIG. 1(b).

Figure 2A:
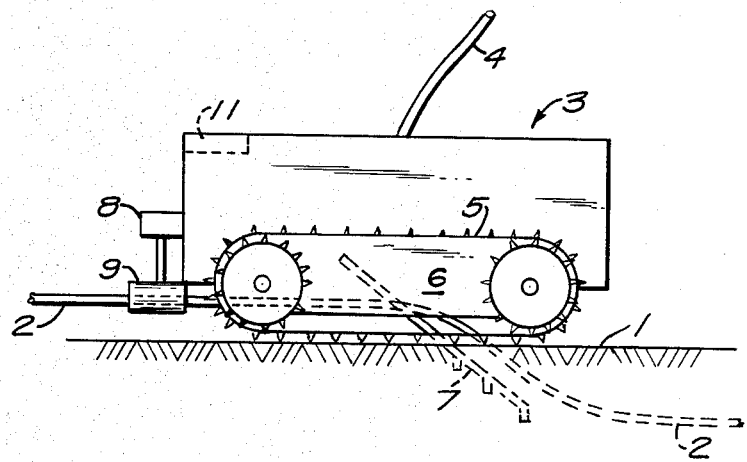
FIG. 2(a) and 2(b) show a preferred embodiment according to the present invention in a side and a frontal views.
Figure 2B:
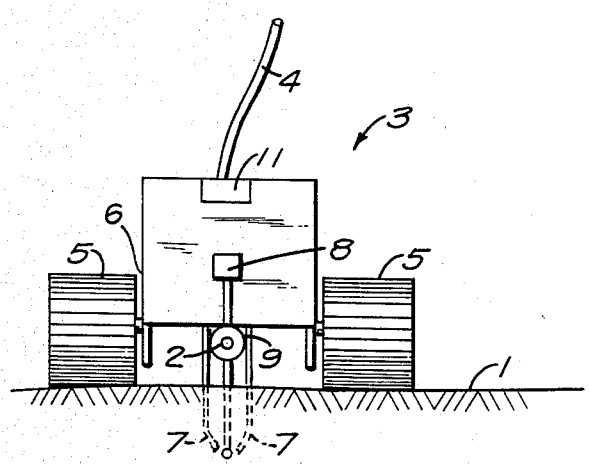

FIGS. 2(a) and 2(b) show the whole structure of an embodiment of a burying device 3 to be used in the burying method according to the present invention. The burying device 3 can travel upon the marine bed 1 by driving a travelling means 5, for instance an endless track, which is operated by energy supplied from the mother ship (not shown), for instance electric power supplied through a control cable 4. On the middle portion 6 of the burying device 3 is provided an excavation means 7 to crush sand and earth and dig a groove on the marine bed, for instance a water jet nozzle using a water pump(not shown). A cable engaging means 9 is provided on the middle portion 6 of the burying device 3, in front of the excavation means 7, and has a sensor 8 to measure the amount of lateral displacement. The cable 2 is guided through the engaging means 9 into the middle portion 6 and finally onto the groove excavated by the excavation means 7 to be buried therein. The excavation means 7 and the cable engaging means 9 are driven by energy supplied from the mother ship, for instance electric power supplied through the control cable 4 similarly as in the case of the travelling means 5.

Figure 3A:
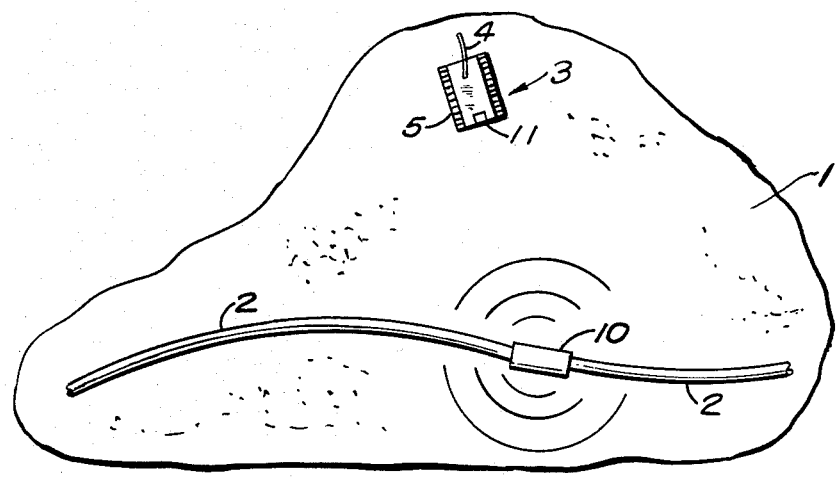
FIGS. 3(a) and 3(b) schematically indicate the states where the burying device is guided to approach a cable.
Figure 3B:
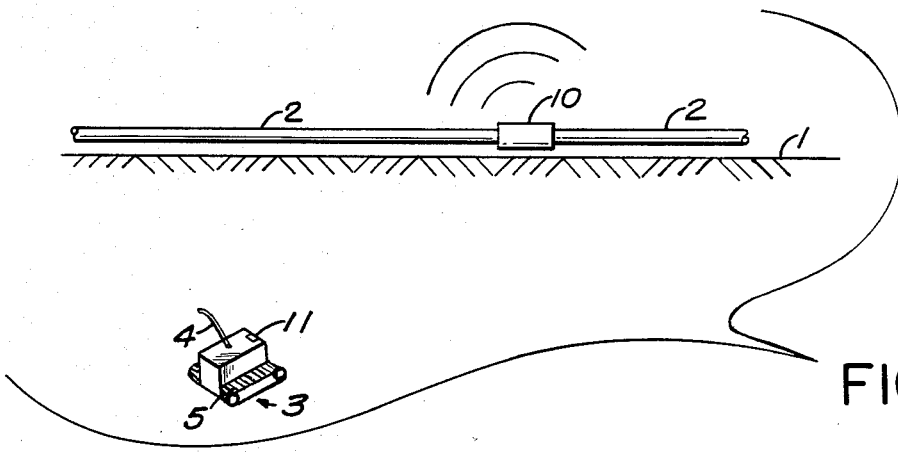

FIGS. 3(a) and 3(b) show the procedure by which the burying device 3 according to the present invention approaches toward the cable 2 laid upon the marine bed 1. Since the cable 2 is provided with a transmitter 10, for instance an ultrasonic oscillator prior to the laying operation in order to indicate the location of the cable, a signal from the transmitter 10 can be received by the receiver 11, for instance an ultrasonic wave receiver provided on the burying device 3, thereby detecting the direction from which the signal comes by calculation. Therefore, the burying device 3 can be guided to approach the cable 2 by driving the travelling means 5 and by controlling the travelling control mechanism (not shown) based upon the result of the signals received by the receiver. The burying device 3 may be controlled to be guided near and onto the cable 2 by using images projected to the mother ship by a TV camera carried on the burying device. In the case where the control by a TV camera is difficult due to high turbidity in the water, however, it is more effective to use the aforementioned ultrasonic detection system or other systems such as an AC magnetic field detector, a metal detector, or a magnetic detector. The present invention contemplates within its scope all systems wherein a burying device can approach a cable by receiving output transmitted from a transmitter mounted on the cable by a receiver mounted on the burying device.

Figure 4A:
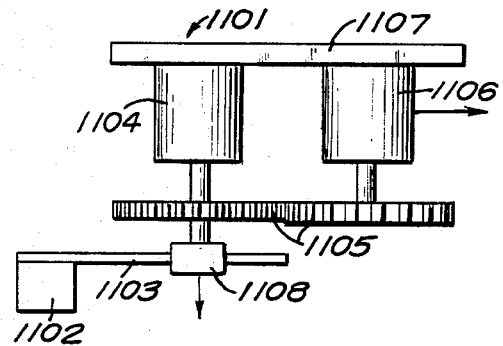
FIGS. 4(a), 4(b), 4(c) and 4(d) are views to explain the structure of an ultrasonic detection system.
Figure 4B:
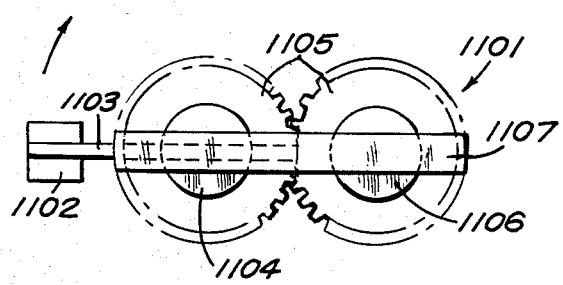

FIGS. 4(a) through 4(d) show an example of the system to make a burying device 3 approach a cable 2 utilizing to the above mentioned ultrasonic detection system. More particularly, the ultrasonic receiving element 1102 of the ultrasonic wave receiver 1101 having a sharp directional sensitivity within a horizontal plane is mounted on an arm 1103 in a manner rotatable by a rotary device 1104 for scanning in a horizontal plane. The revolution by the rotary device 1104 in turn rotates the shaft of a potentiometer 1106 through a transmission gear 1105. The rotary device 1104 and the potentiometer 1106 are mounted on a table 1107 and the table 1107 is fixed on the burying device 3 (not shown). The output from the ultrasonic receiving element 1102 is guided consecutively through a slip ring 1108, a band pass filter 1109, an amplifier 1110 and a detector 1111 to be detected and is given a pulse output. A voltage 2E is fed between fixed contacts of the potentiometer 1106, the voltage at the moving contact of the potentiometer 1102 is adjusted to make the ultrasonic wave receiver element 1102 become precisely at E in a direction in front of the burying device 3 (not shown). If the ultrasonic wave receiving element 1102 is rotated clockwise by the rotary device 1104, as indicated in FIGS. 4(a) and 4(b), the voltage at the moving contact of the potentiometer 1106 moves from 0 to E FIG. 4(c) while the ultrasonic wave receiving element 1102 travels from a position behind of the burying device 3 (not shown) to a position in front thereof, in other words from 0° to 180°. Similarly, the voltage at the moving contact of the potentiometer 1106 moves from E to 2E FIG. 4(c) while the ultrasonic wave receiving element 1102 travels from a position in front of the burying device 3 (not shown) to a position behind thereof or from 180° to 360°, repeating such movements in a serrated form.

Figures 4C, 4D:
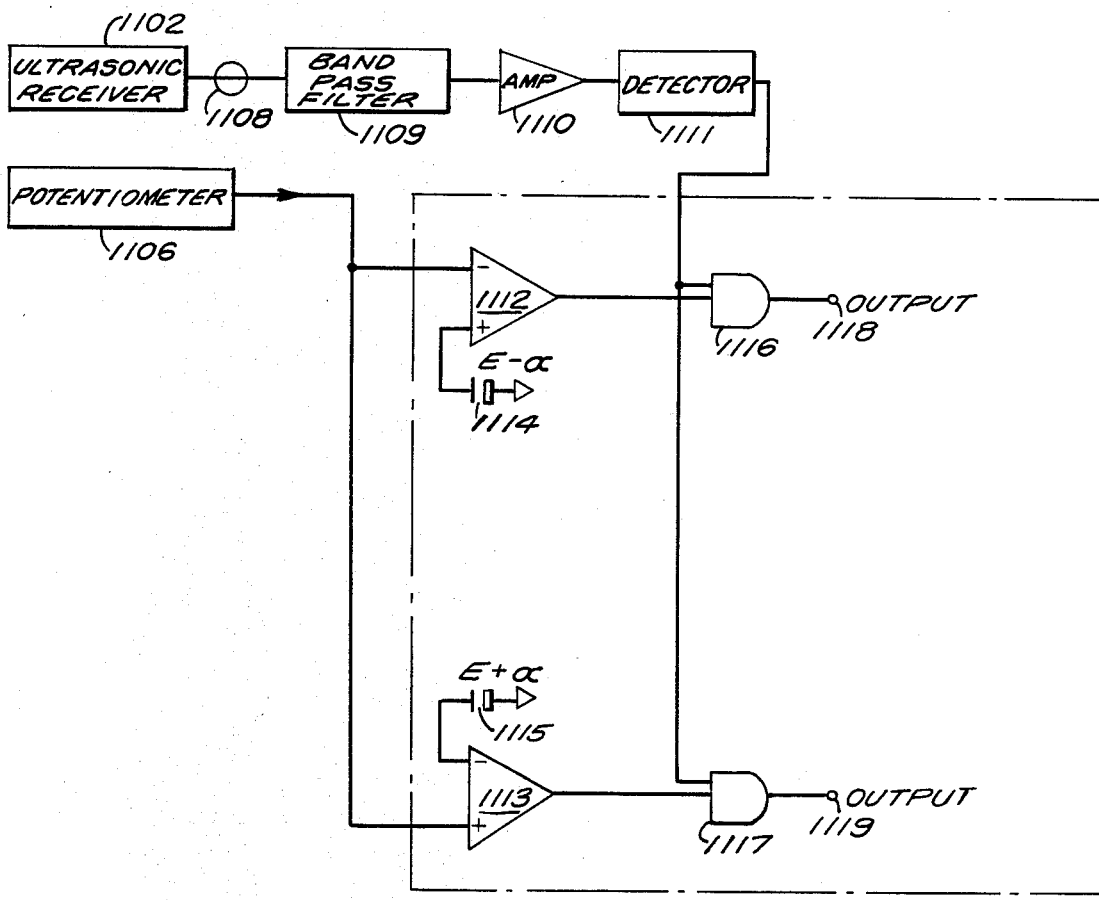

A portion encircled by a dot-and-chain line in FIG. 4(d) denotes a travelling control circuit wherein the reference numerals 1112, 1113 denote comparators, 1114, 1115 voltage sources (specifically 1114 denotes a voltage $E-\alpha$, 1115 a voltage $E+\alpha$) wherein $\alpha$ is a small value. The reference numerals 1116 and 1117 denote AND circuits while 1118 and 1119 denote output terminals. When the voltage at the moving contact of the potentiometer 1106 is less than $E-\alpha$, the output from the comparator 1112 becomes "HIGH" while the output from the comparator 1113 becomes "LOW", and when the voltage at the moving contact of the potentiometer 1106 is from $(E+\alpha)$ to 2E, the output from the comparator 1113 becomes "HIGH" while the output from the comparator 1112 becomes "LOW". Therefore, if the ultrasonic wave receiver element 1102 receives an output from the ultrasonic transmitter 10 at a location to the left of the burying device 3 (not shown), or, in other words, a position between 0° and $(180°-\beta)$ (wherein $\beta$ is a small value), and a pulse output is transmitted from the detector 1111, since the output from the comparator 1112 is kept at "HIGH" between 0° and $(180°-\beta)$, the AND circuit 1116 becomes "HIGH" to feed an output to the output terminal 1118 as well as to feed an output to the counterclockwise control circuit of the burying device 3 (not shown). During this period the output terminal 1119 assumes 0 status. The ultrasonic wave receiving element 1102 receives an output transmitted from the ultrasonic transmitter 10 at a position to the right of the burying device 3 (not shown) or between 180° and $(360°-\beta)$ (wherein $\beta$ is a small value) to generate a pulse output at the detector 1111 since the output from the comparator 1113 is kept at "HIGH" between 180° and $(360°-\beta)$, AND circuit 1117 becomes "HIGH" and an output is fed to the output terminal 1119 to supply an output to the clockwise control circuit of the burying device 3 (not shown). During this period the output terminal 1118 assumes the 0 state. Following the above procedure, the output transmitted from the ultrasonic transmitter 10 mounted on the marine cable in advance can be transmitted to the ultrasonic wave receiver 1101 mounted on the burying device 3 so as to make the burying device 3 approach toward the marine cable based upon the output therefrom.

After the burying device 3 is made to approach the marine cable 2, the cable 2 has to be engaged with the cable engaging means 9. The procedure to engage the cable 2 within the engaging means 9 is an important operation which is a pre-requisite for travelling the burying device 3 precisely along the cable 2 as well as for accurately guiding the cable 2 into the excavated groove in the marine bed. FIGS. 5(a) and 5(b) illustrate an embodiment of the cable engaging means 9. As described hereinbefore, the engaging means 9 has to detect the route of the laid cable 2 in order to travel precisely therealong and therefore, this embodiment is designed to have a mechanism to hold and clamp the cable 2 as well as a mechanism to detect the cable route. The reference numerals 901, 901' denote engaging mechanisms in a semi-cylindrical form which are respectively supported by plates 902 and 902'. The plates 902 and 902' are connected by a spring 903 to force open the engaging mechanisms 901 and 901'. The reference numerals 904 and 904' denote pulleys which are freely rotatable around rotating shafts 905 and 905' in contact with the plates 902 and 902'. As shown in FIGS. 6(a) and 6(b) rotating shafts 905, 905' are connected via arms 906, 906' to a mechanism to detect expansion/compression thereof 907, 907' for instance strain gages, which are fixed on the middle portion 6 of the burying device 3. The reference numeral 908 denotes a hinge to connect the plates 902 and 902', 909 a hydraulic cylinder and 910 a piston rod which is reciprocated by the hydraulic cylinder 909. The hydraulic cylinder 909 is fixed on the middle portion 6 of the burying device 3 while the tip end of the piston rod 910 is connected to the hinge 908. The hydraulic cylinder 909 is driven by a hydraulic unit (not shown).

FIGS. 6(a) and (b) illustrate the operation of this embodiment of the cable engaging means 9. The output from the transmitter 10, mounted in advance on the cable 2, is received by the receiver 11 mounted on the burying device 3, and the burying device 3 is guided based upon the output from the receiver 11 so that the cable comes between the right and left travelling means provided on the burying device 3. Under this condition the semicylindrical engaging mechanism 901 and 901' are kept open by the spring 903. The hydraulic cylinder 909 is operated to compress the piston rod 910 by driving the hydraulic unit (not shown). The plates 902, 902' are pulled by the compression of the piston rod 910 in contact with the pulleys 904, 904' to the direction indicated by the arrow mark in FIG. 6(a), thereby making the semi-cylindrical engaging mechanisms 901, 901' to approach to each other while compressing the spring 903. During such movement, the engaging mechanisms 901 and 901' catch the cable 2 therebetween as illustrated in FIG. 6(b). When the cable 2 is engaged with the engaging mechanism at the center thereof, the outputs to the right and the left expansion/compression detectors 907, 907' are identical (the difference therebetween is null). When the cable route deviates from the advancing direction of the burying device 3 either to the right or to the left thereof, since the cable 2 engaged with the engaging mechanisms 901, 901' energizes a force to push either one of the mechanism 901 or 901' on the side of the deviation, the force is transmitted through the plate 902, 902', pulley 904 or 904', the rotary shaft 905 or 905', and the arm 906 or 906' which are respectively positioned on the side of the deviation to finally reach the expansion/compression detector 907, 907', thereby detecting the relative position of the cable route to the burying device 3. The burying device 3 can engage the cable 2 with the engaging mechanisms 901, 901' and detect the route of the cable 2 with the expansion/compression mechanisms 907,907' while travelling along the route by using the travelling means 5. Therefore, the device can completely bury the cable underneath the marine bed 1 by operating the excavation means 7 of the burying device which travels along the route while engaging the cable therewith.

As described hereinabove, the present invention can solve problematic matters conventionally considered impossible or extremely difficult and enables the device to bury a cable under the marine bed accurately as well as effectively under any conditions, attaining a remarkable achievement.

What is claimed for:

1. A marine cable burying device comprising:
   a vehicle adapted for movement along a marine bed;
   ultrasonic signal-receiving means carried by said vehicle for receiving transmissions from ultrasonic oscillators previously positioned along the cable, said signal-receiving means being rotatable and directed for scanning in a horizontal plane;
   means for rotating said signal-receiving means, including a potentiometer rotatable therewith;
   means coupled to said receiving means for guiding said vehicle towards the cable in response to said transmissions by comparing the detected output from said ultrasonic signal-receiving means with the potentiometer reading obtained by rotational scanning;
   means carried by said vehicle for excavating a trench in the marine bed;
   means extending forward of said vehicle and having arms for engaging the cable, each arm terminating in a semicylindrical engagement device, the arms being spring loaded for forcing apart said engagement devices allowing any one of said engagement devices to contact the cable upon approach of the burying device to the cable; and
   means responsive to movements of said arms for directing said vehicle along the cable to provide for the excavation of a trench at the location of the cable, said directing means including a set of sensors coupled to respective ones of said arms for sensing a displacement of one of said arms in response to contact of the engagement device of said one arm with the cable, said engaging means lowering the cable into the trench for burial.

* * * * *